(No Model.)

A. H. HOYT.
GALVANOMETER.

No. 497,522. Patented May 16, 1893.

Witnesses
Jas. J. Maloney
M. E. Hill

Inventor
Adrian H. Hoyt,
by Jos. P. Livermore
Att'y

UNITED STATES PATENT OFFICE.

ADRIAN H. HOYT, OF MANCHESTER, NEW HAMPSHIRE, ASSIGNOR TO THE WHITNEY ELECTRICAL INSTRUMENT COMPANY, OF SACO, MAINE.

GALVANOMETER.

SPECIFICATION forming part of Letters Patent No. 497,522, dated May 16, 1893.

Application filed November 14, 1891. Serial No. 411,905. (No model.)

*To all whom it may concern:*

Be it known that I, ADRIAN H. HOYT, of Manchester, county of Hillsborough, State of New Hampshire, have invented an Improvement in Galvanometers, of which the following description, in connection with the accompanying drawings, is a specification, like letters on the drawings representing like parts.

My invention relates to a galvanometer or instrument for indicating the strength of an electric current, and is shown in this instance as embodied in an instrument especially adapted for indicating the voltage or electromotive force of a current.

The instrument comprises a permanent field magnet and an armature or needle having a pivotal movement therein and provided with a pointer to indicate in connection with a properly graduated scale the amount of such movement, the instrument also comprising a solenoid or coil for the current to be measured the effect of which is to turn the needle from the position it occupies when exposed only to the force of the field magnet.

The invention consists in details of construction to be hereinafter described and claimed.

Figure 1:
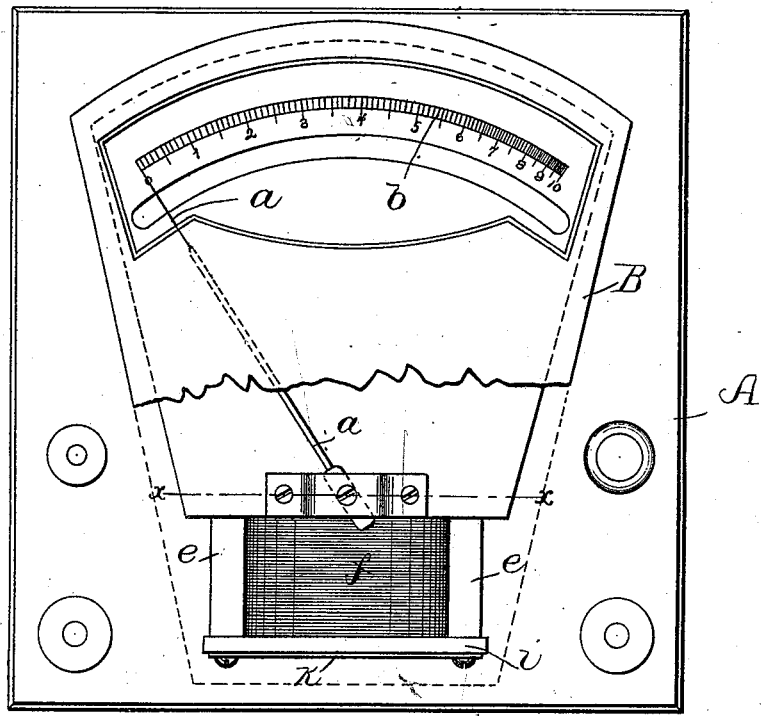
Figure 2:
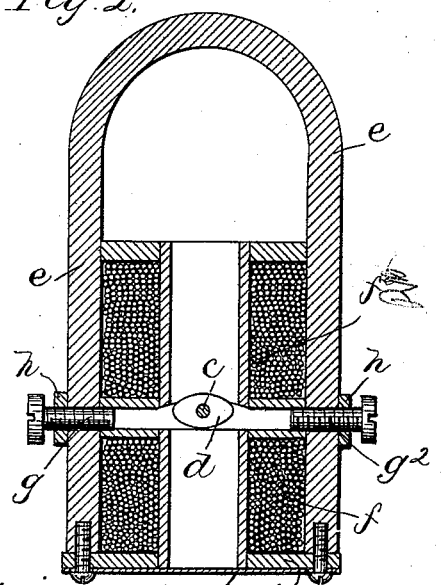
Figure 3:
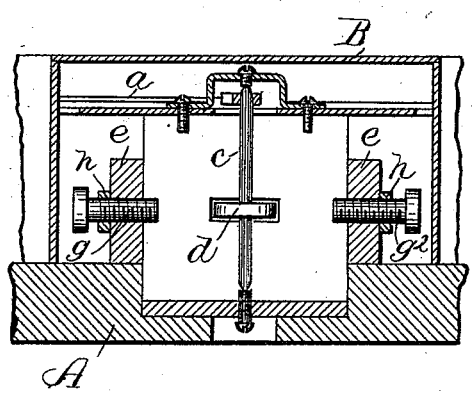

Figure 1 is a plan view of a galvanometer embodying this invention a portion of the inclosing case being broken away; Fig. 2 a detail showing the field magnet in longitudinal section, and Fig. 3 a transverse vertical section thereof, on line $x, x$, Fig. 1.

The operative parts of the instrument are supported on a base plate A and inclosed by a movable cover B having an opening through which the indicating pointer $a$ and graduated scale $b$ may be observed. The said pointer is mounted upon an arbor $c$ see Figs. 2 and 3, in suitable bearings and provided with an armature or needle $d$ which operates in a magnetic field produced by the magnet $e$ which may be of the usual horse-shoe construction and which contains between its branches the solenoid coils $f$ through which the current to be measured is caused to pass. The said solenoid coils are wound on a flat tube having its longitudinal axis parallel with the branches of the magnet $e$ as shown in Fig. 2, the said coil occupying the space between the branches and the magnet for a considerable portion of their length. The armature or needle $d$ is located about midway of the length of the solenoid coil, being at some distance from the extremities of the branches of the magnet $e$ and the said branches are provided with adjustable pole pieces $g, g^2$, shown as iron screws working in transverse openings in the branches of the magnet $e$ in line with the said needle $d$ so that they can be turned in or out so as to bring their inner ends nearer to or farther from the ends of the needle $d$. The said pole piece screws are shown as provided with check nuts $h$ to lock them when properly adjusted and the directive influence of the magnetic field upon the needle $d$ may be varied by adjusting the said pole pieces $g, g^2$, the said directive influence being increased as said pole pieces are screwed inward and diminished as they are screwed outward, so that it can at any time be brought to the desired amount, and if the strength of the magnet $e$ should vary, its directive influence might be retained constant by making the proper adjustments of said pole pieces as such variations occur.

The coils $f$ are shown as supported between non-magnetic frame plates one of which as $i$ is screwed to the extremities of the magnet $e$ and a thin strip of iron or steel is employed to magnetically connect the said extremities of the magnet the said plate $k$ being secured by iron screws turned into the ends of the magnet so that it causes a portion of the magnetic influence that would otherwise be produced by the magnet to be withdrawn from the armature $d$, and renders the influence of the adjustable poles more delicate.

I claim—

1. The combination of the horse-shoe field magnet $e$ with the solenoid coils $f$ between the branches of said magnet and with its axis parallel thereto; the needle or armature $d$ pivoted at an intermediate point in the length of said solenoid coil and the adjustable pole pieces $g, g^2$, connected with the branches of the magnet and extending between the coils of the solenoid toward the needle, substantially as and, for the purpose described.

2. The combination of the pivoted indicating armature or needle with the coil and the field magnet having its extremities connected by a magnetic strip and having adjustable polar extensions cooperating with the said
5 needle, substantially as and for the purpose described.

In testimony whereof I have signed my name to this specification in the presence of two subscribing witnesses.

ADRIAN H. HOYT.

Witnesses:
JOS. P. LIVERMORE,
M. E. HILL.